United States Patent
Craig et al.

(10) Patent No.: US 11,402,459 B2
(45) Date of Patent: Aug. 2, 2022

(54) DISTRIBUTED RADIO SIGNAL TARGETING DEVICE

(71) Applicant: Truenorth Rescue Inc., Las Vegas, NV (US)

(72) Inventors: Murray Craig, Laguna Niguel, CA (US); John Shaw, Tualatin, OR (US)

(*) Notice: Subject to any disclaimer, the term of this patent is extended or adjusted under 35 U.S.C. 154(b) by 137 days.

(21) Appl. No.: 16/928,524

(22) Filed: Jul. 14, 2020

(65) Prior Publication Data

US 2020/0393530 A1    Dec. 17, 2020

Related U.S. Application Data

(60) Provisional application No. 62/861,956, filed on Jun. 14, 2019.

(51) Int. Cl.
*G01S 5/02* (2010.01)
*G01S 19/17* (2010.01)
*G01S 3/32* (2006.01)

(52) U.S. Cl.
CPC ............ *G01S 5/0231* (2013.01); *G01S 3/325* (2013.01); *G01S 19/17* (2013.01)

(58) Field of Classification Search
CPC .................................................... G01S 5/0231
See application file for complete search history.

(56) References Cited

U.S. PATENT DOCUMENTS

| | | | | |
|---|---|---|---|---|
| 6,992,632 | B1* | 1/2006 | Mohuchy | H01Q 9/065 343/846 |
| 9,322,911 | B1* | 4/2016 | Sacco | G01S 7/03 |
| 10,274,632 | B1* | 4/2019 | Olsson | G01S 19/14 |
| 2009/0160638 | A1* | 6/2009 | Jesme | H01Q 1/2216 340/539.11 |

* cited by examiner

*Primary Examiner* — Travis R Hunnings
(74) *Attorney, Agent, or Firm* — CIONCA IP Law P.C.; Marin Cionca

(57) ABSTRACT

Apparatuses and methods are disclosed that allow for the detection, identification and direction finding of search and rescue beacons in a variety of environments. The techniques may be used to identify a line of bearing (LOB) to 121.5 MHz rescue beacons found in aircraft (ELTs), marine beacons (EPIRBs), and personal locator beacons (PLBs). Multiple lines of bearing may be used to geo-locate a target emitter if so desired. The methods may utilize, for example, a handheld device that is designed for search and rescue activity. Additionally, this device may be able to decode a 406 MHz frequency beacon that communicates with the satellite system that is controlled by COSPAS SARSAT. This constellation of rescue satellites coordinates the location of 406 MHz rescue beacons.

8 Claims, 11 Drawing Sheets

DISTRIBUTED RADIO SIGNAL TARGETING DEVICE

BACKGROUND

This disclosure relates to direction finding systems and more particularly to the utilization of information from a phased array antenna and boom assembly.

In numerous applications (e.g., electronic warfare, navigational and related systems), a requirement exists for high accuracy lines of bearings from the direction of arrival of an electrical signal. The signal, for example, may be generated by either one of the 406 MHz or 121.5 MHz rescue beacons.

The conventional method employed for direction finding has been the use of a multi-element Yagi antenna and boom assembly that is directional, but is large and unwieldy in mobile applications. These devices may be mounted on vehicles, airplanes or watercraft.

While various systems have been proposed in the past to resolve the ambiguity indicated above (determining a small, precise area in which to conduct a search) to provide accurate direction-finding readings, these systems normally involve the use of two or more sets of antennas. This typically requires antenna and boom assembly receiver subsystems, which are both complicated and expensive. In addition, some of the systems have required the receipt of more than one input pulse in order to make the direction-finding determination.

Thus, there is a need for a mobile direction-finding system that provides high accuracy, unambiguous readings with a good sensitivity.

BRIEF SUMMARY

This disclosure relates to direction finding systems and more particularly to the utilization of information from a phased array antenna and boom assembly that may provide unparalleled accuracy in its lines of bearing. This information is used during the rescue and recovery of search and rescue beacons that are transmitting on 121.5 MHz and 406 MHz international rescue frequencies.

This disclosure provides a direction finding system of the type indicated above that requires the use only of a single phased array antenna and boom assembly with two dipole elements and thus provides a relatively light, mobile and inexpensive solution compared to the current industry standard.

The disclosure also provides a direction-finding system of type indicated above, which is adaptable to make the direction-finding determination on the basis of a continuous beacon output.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
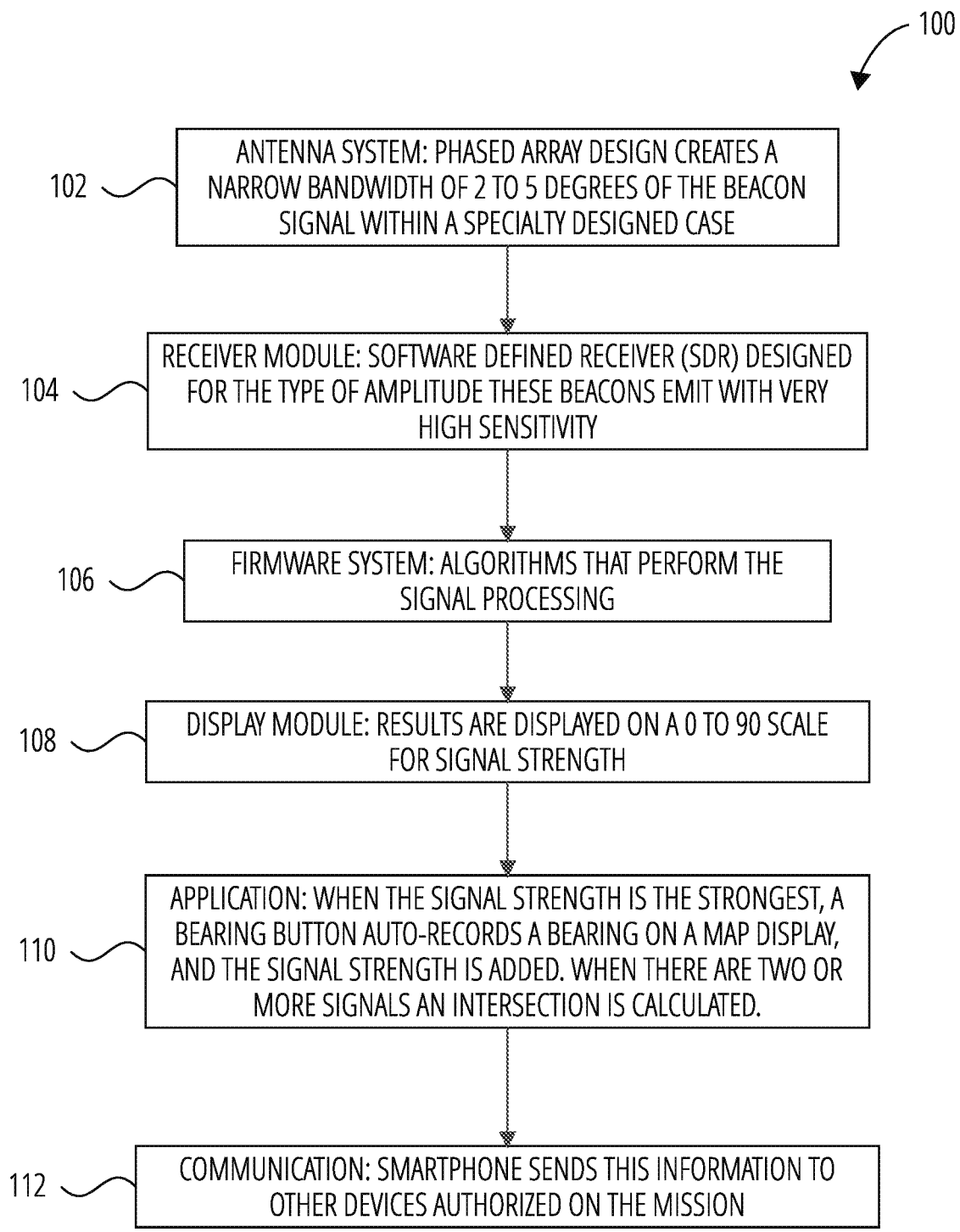
FIG. 1 illustrates a method of using a portable direction finder system 100 showing the stages from detection using the antenna system 102 to communication 112 based on received and analyzed data.

"Portable direction" refers to a user-directed means of finding a target emitter.

"Housing" refers to the physical encasement of the portable direction finder.

"Antenna and boom assembly" refers to the portion of a device for receiving an electrical signal from rescue beacons that may be used in direction finding.

"Phased-array antenna" refers to a set of antennae within the antenna and boom assembly that may include two dipole elements used to receive 121.5 MHz signals.

"Receiver assembly" refers to a component within the portable direction finder including a radio frequency module and a digital signal processing module.

"Radio frequency module" refers to a component of the receiver assembly that receives a signal from the antenna and boom assembly (also known as an RF module).

"Digital signal processing module" refers to a component of the receiver assembly in communication with various components, such as an electronic compass interface, boom controls, RF board I/Q audio, RF Board gain, etc. (also known as a DSP module). The DSP may also process the I and Q inputs to provide a signal strength measurement as well as signal demodulation.

"Signal" refers to an electronic reading from the antenna and boom assembly received by the RF module.

"RF module" refers to a component of the receiver assembly that receives the signal from the antenna and boom assembly. (also known as a Radio frequency module)

"Electronic compass" refers to an internal component of the portable direction finder providing, in communication with the digital signal processing module, a direction in which the portable direction finding system is pointed.

"Direction" refers to a measure, in degrees, provided by the electronic compass and shown on the display of the portable direction finder.

"Display" refers to a screen, attached to the portable direction finder, showing the direction received from the electronic compass.

"Handle" refers to a protrusion from the portable direction finder allowing a user to hold the antenna and boom assembly upright.

"Area" refers to a geographic location in which to identify rescue beacons using a portable direction finder.

"Portable direction finder" refers to a handheld device for locating a target emitter using phase array circuitry 1000, a radio frequency module, a digital signal processing module, an electronic compass and other electronic components.

"Rescue beacons" refers to emitters of a signal identified in an area of interest using a portable direction finder.

"Target emitter" refers to a signal source, based on peak signal strength and selected for direction determination.

"Target azimuth" refers to a signal measurement based on the target emitter basis of peak signal strength.

"Peak signal strength" refers to component of a signal received by the antenna and boom assembly, used for identifying a target azimuth of the target emitter.

"DSP module" refers to a component of the receiver assembly in communication with the electronic compass that provides a direction to the portable direction finder. (also known as a Digital signal processing module)

"User" refers to a human agent manipulating and analyzing the results of the portable direction finder.

"First location" refers to a geographic location, based on the target azimuth, which determines a first line of bearing to the target emitter.

"Intersection" refers to a geographic location, between for example, first line of bearing and a second line of bearing, containing a latitude and longitude with high probability of detection.

"Latitude" refers to the angular distance north or south of the earth's equator, measured in degrees along a meridian.

"Boom assembly" refers to a component of the portable direction finder providing signal transmission capability from an antenna to the RF module.

"406 RF module" refers to an electronic component, internal to the antenna and boom assembly, capable of receiving 406 MHz signals in addition to 121.5 MHz rescue beacons.

"Mount" refers to a physical structure attached to the portable direction finder supporting, for example, a smartphone to use as a means of displaying data to the user.

"Smartphone" refers to a portable device, which may be internet-connected, serving as a means of receiving data from the DSP module and displaying it to the user.

"first line of bearing" refers to a reading, in degrees, providing an initial reading of the maximum signal strength.

"Second line of bearing" refers to a reading, in degrees, providing a second reading of signal strength after moving left or right with the portable direction finder of the first location.

"Dipole elements" refers to a pair of directional antennae, coupled through an antenna phasing network 1010 and phased in a manner to increase the precision of the directionality to the rescue beacons.

"AIS frequency detection module" refers to an electronic component, internal to the antenna and boom assembly, capable of monitoring and receiving AIS "A" (161 MHz) and AIS "B" (162 MHz) signals.

This disclosure provides a system for direction finding of the arrival of an electrical signal. The compact phased array antenna and boom assembly provides a signal to a receiver, which amplifies the signal and ultimately provides a signal strength reading to the user. The antenna and boom assembly may include two, close spaced dipoles, each connected to phase control circuitry to produce a compact, phased array antenna and boom assembly tuned to 121.5 MHz. The receiving system may incorporate an electronic compass for determining the bearing of the source. Multiple systems at different locations may coordinate with each other to provide multiple bearings from different locations, thereby enabling triangulation of the source location. This use requires inclusion of GPS locators in each direction-finding system, as well as network connections to each, most easily accomplished via applications running on smartphones.

The user performs a 360-degree sweep along the horizon, noting the direction where the signal amplitude reaches maximum strength. This direction provides a rough bearing to the signal source. Then, sweeping back and forth along the horizon near this bearing enables determination of a more accurate bearing of the source. The receiver also demodulates the detected signal and provides audio to the user to help verify that the signal is from an emergency beacon.

Referring to FIG. 1, a method of using a portable direction finder system 100 begins when an antenna system 102 with a phased array design creates a narrow bandwidth of 2 to 5 degrees of the beacon signal within a specialty designed housing. The receiver module 104 receiving this data includes a software defined receiver (SDR) designed for the type of amplitude these beacons emit with very high sensitivity. Next the firmware system 106 includes algorithms that perform the signal processing; the results are displayed on a 0 to 90 scale for signal strength on a display module 108. A software application 110 determines when the signal strength is the strongest, a bearing button auto-records a bearing on a map display, and the signal strength is added. When there are two or more signals, an intersection is calculated. Lastly, for communication 112 purposes, a smartphone may send this information to other devices authorized on the mission.

Figure 2:
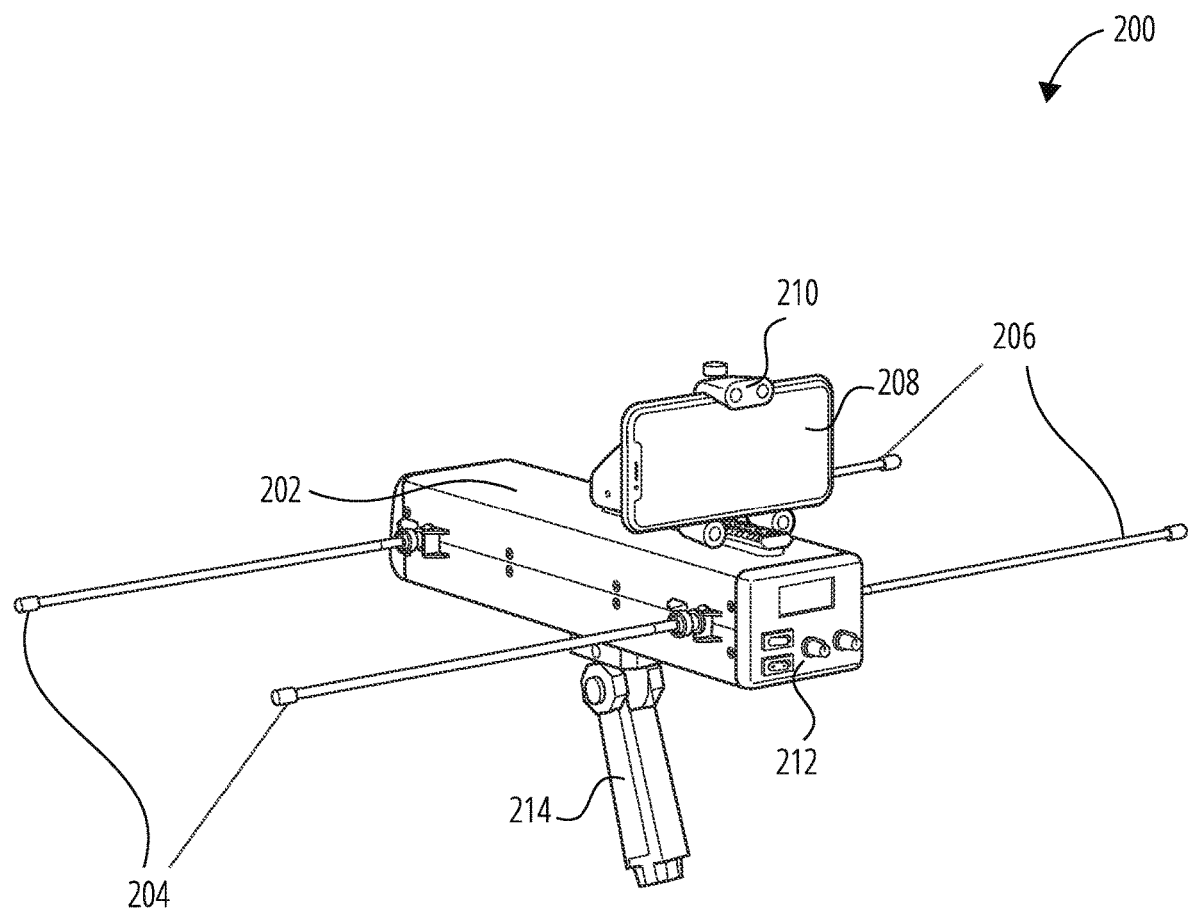
FIG. 2 illustrates a portable direction finder 200 including a phased-array antenna including two dipole elements.

Referring to FIG. 2, the enclosed portable direction finder 200 shows the external components of the portable direction finder hardware device. Protruding from the housing 202 are dipole elements 204 and dipole elements 206, whose configuration is described in detail in FIG. 10. An optional smartphone 208 is mounted on the top of the housing 202 and secured with a mount 210. A display 212 indicates to a user the direction from an electronic compass. A handle 214 provide the user a means to secure, move and otherwise portably manipulate the entire portable direction finder 200.

Figure 3:
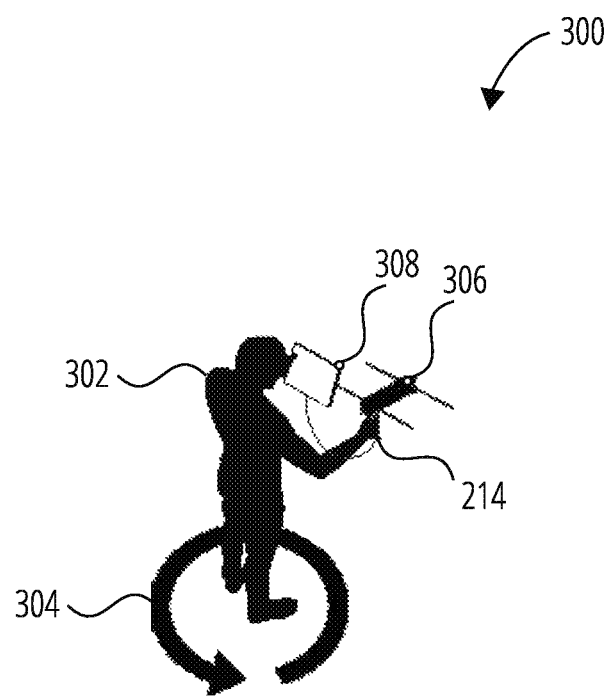
FIG. 3 illustrates a user reading device first line of bearing 300 showing a user sweeping 360 degrees with the device to gather an initial reading of the maximum signal strength.

Referring to FIG. 3, a user reading device first line of bearing 300 illustrates a user 302 holding the antenna and boom assembly 306 by its handle 214. Upon enacting a 360 degree turn-around 304, the user 302 reads the electronic compass direction first line of bearing results on the display 212 of the antenna and boom assembly 306 facing the user.

Figure 4:
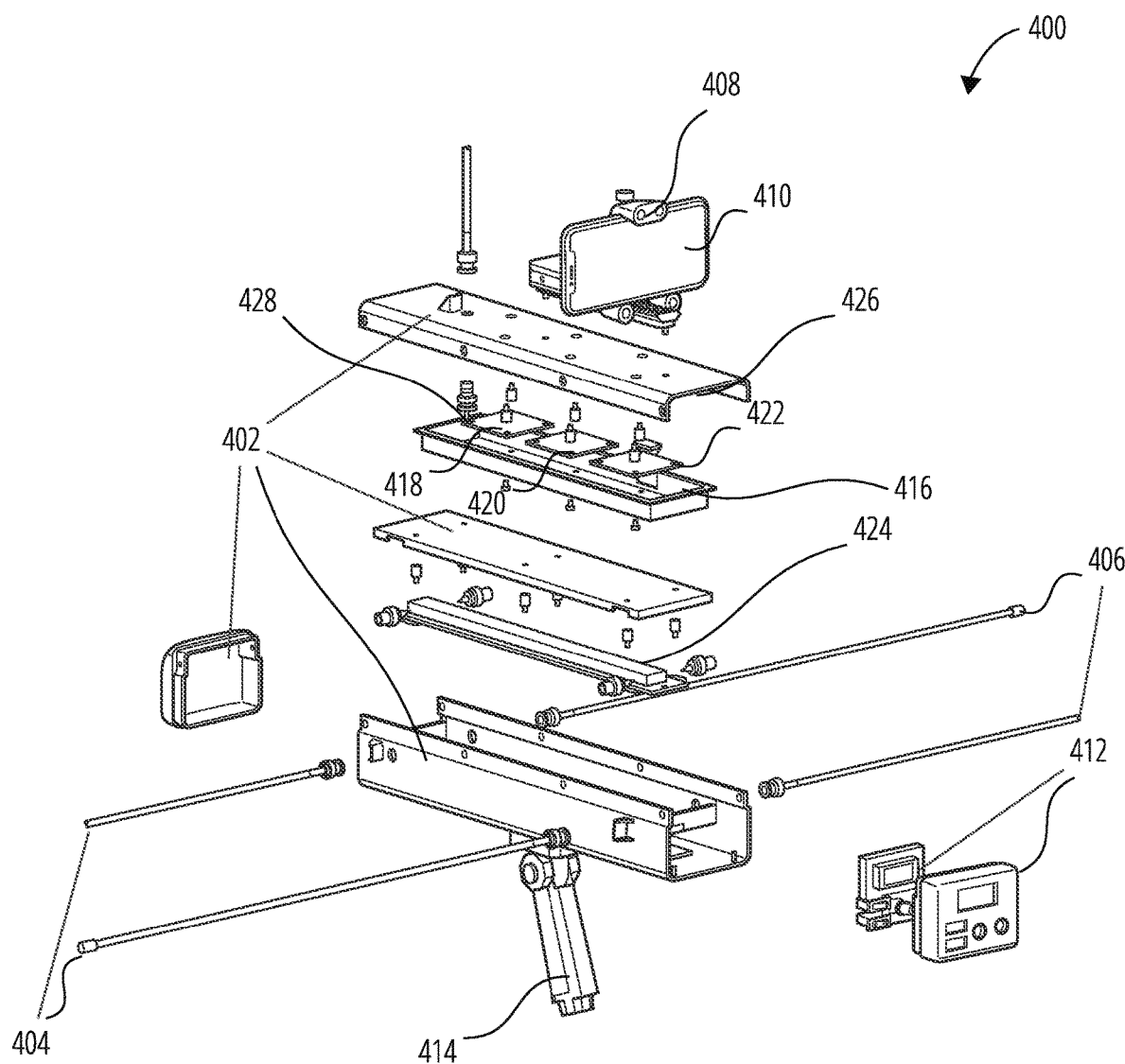
FIG. 4 illustrates the components of the portable direction finder 200, including the housing, dipole elements, smartphone 410, and display 412.

Referring to FIG. 4, an exploded view of the portable direction finder 400 comprises a housing 402 including top, bottom and middle metal plates along with a backing to secure the internal components. The dipole elements 404 and dipole elements 406 comprise an antenna phasing network 1010. Phasing the dipole elements increases the precision of the directionality to the beacon by removing spurious signals in signal processing that may be in close proximity to the target emitter in both physical location and frequency.

Several internal electronic components assist the user in determining the direction and peak signal strength of the target emitter. An electronic compass 424, in communication with a digital signal processing module 420, provides a direction of the portable direction finder to the user on the display 412. A radio frequency module 418, upon receiving a signal, provides mixing, filtering and amplification based the signal frequency. The digital signal processing module 420 processes the inputs to provide a signal strength measurement as well as any required signal demodulation. To receive and process 406 MHz signals, an optional 406 RF module 422 also provides mixing, filtering and amplification based on this specific signal frequency. To receive and process AIS "A" (161 MHz) and AIS "B" (162 MHz) signals, an optional AIS frequency detection module 428 monitors for these frequencies. Frequency monitoring is available through the use of a digital receiver 426 in the lid of the antenna and boom assembly housing 402 and is designed not interfere with the 121.5 MHz frequency.

The display 412, located on the end of the housing 402 facing the user, provides a visual indication of the target emitter signal direction based on the electronic compass 424 along with a first line of bearing. A smartphone 410 may be secured to the antenna and boom assembly 306 by a mount 408, providing a software application 110 that determines and displays precise geographical information such as a latitude and longitude with high probability of detection based on a user entering first line of bearing and second line of bearing.

A handle 414 allows a user to secure, direct and manipulate the complete portable direction finder as shown in FIG. 3. The handle 414 may also prevent the user from interfering with the reception of the signals by the dipole elements.

Figure 5:
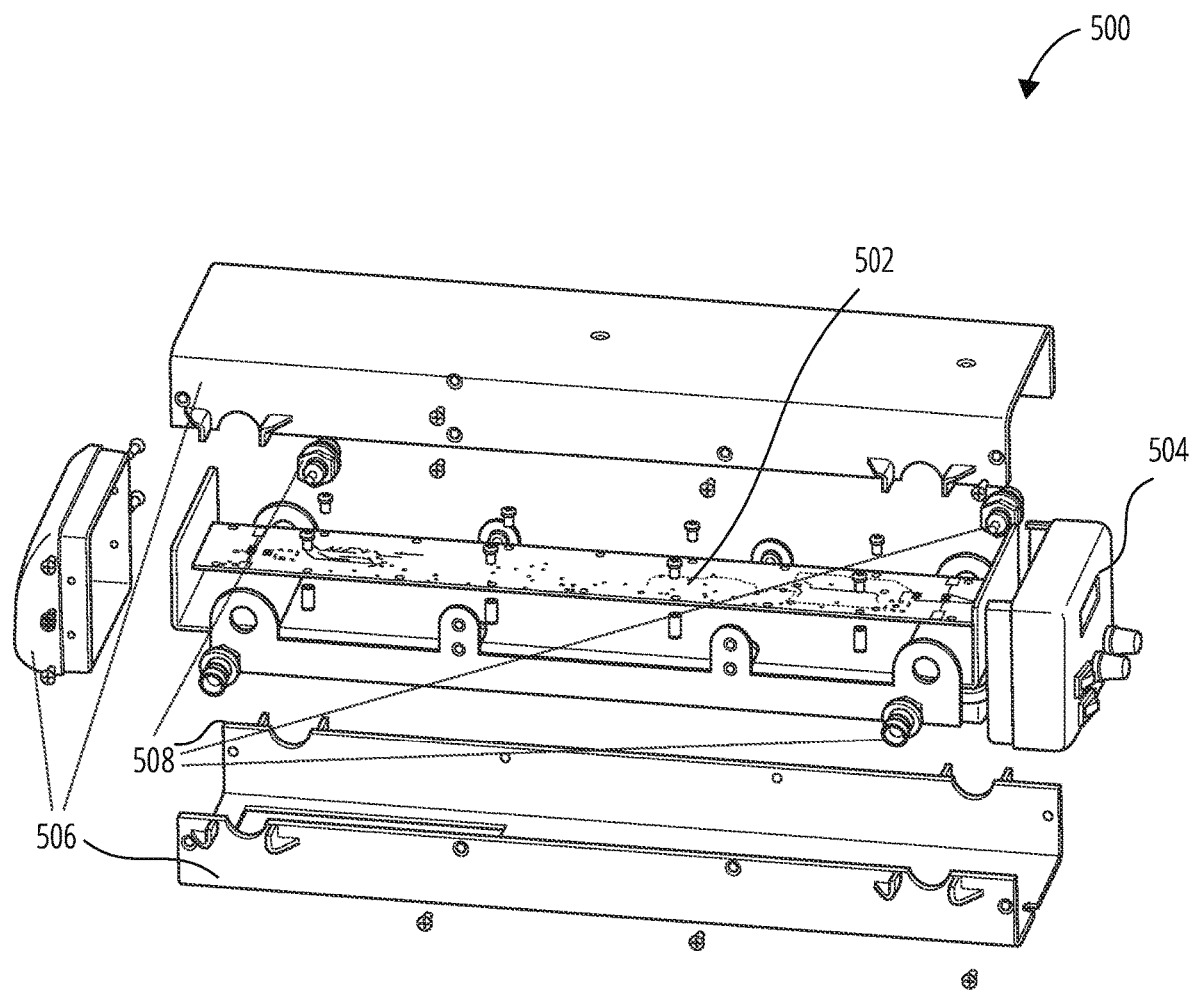
FIG. 5 illustrates a right side cutaway of antenna and boom assembly 500 showing internal details of the antenna and boom assembly including the electronic compass and the connections to the dipole elements.

Referring to FIG. 5, the right side cutaway of antenna and boom assembly 500, the housing 506 provides a structure for the antenna and boom assembly into which is situated the electronic compass 502 and four connectors for dipole elements 508 onto which are attached the dipole elements 404 and dipole elements 406. Onto the user-facing section of the housing 506 is the display 504 providing a visual indication of the target emitter signal direction based on the electronic compass 502 along with a first line of bearing.

Figure 6:
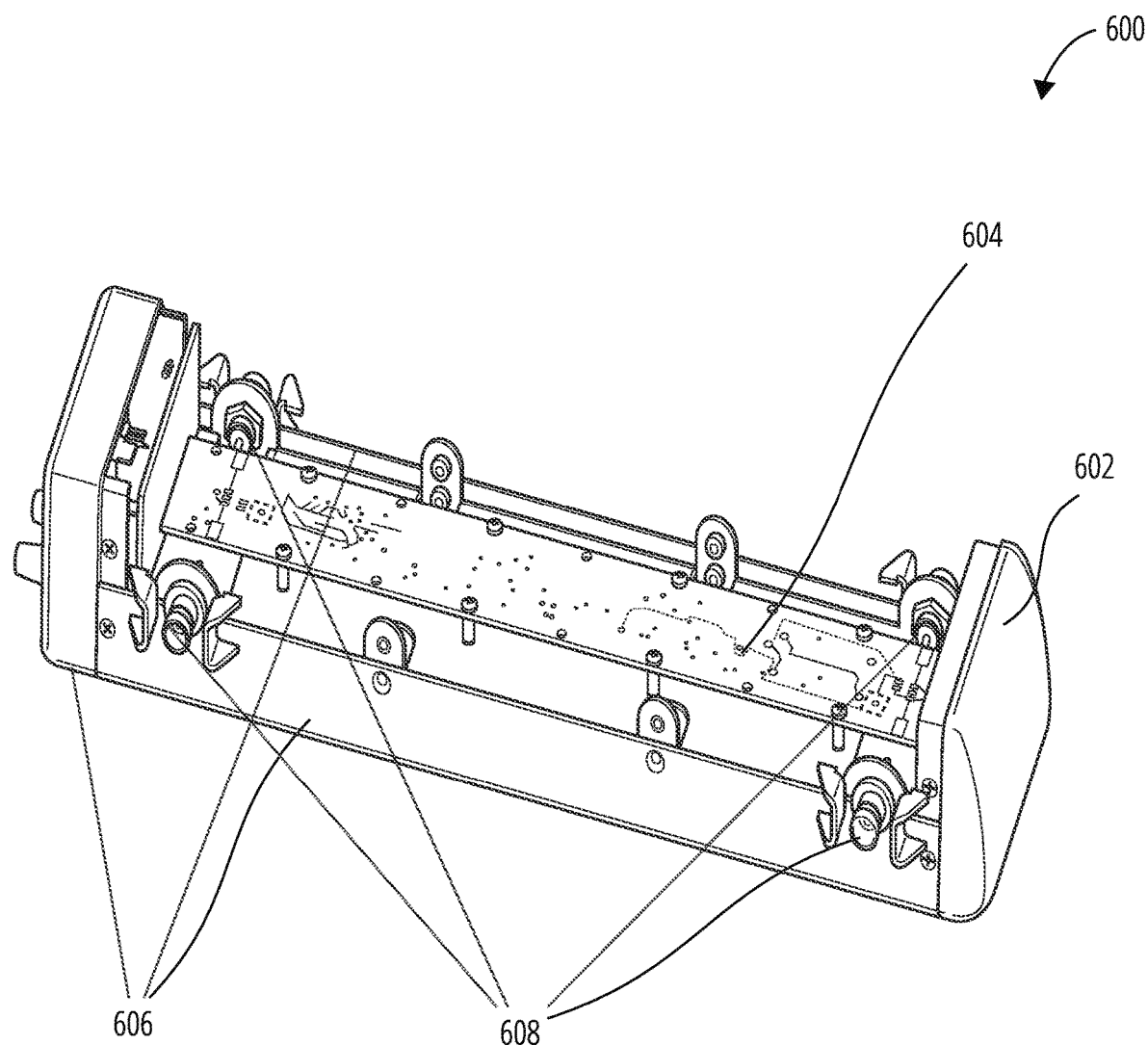
FIG. 6 illustrates a left side cutaway of antenna and boom assembly 600 showing internal details of the antenna and boom assembly including how the housing fits around the electronic compass and other components.

Referring to FIG. 6 the left side cutaway of antenna and boom assembly 600, the housing 606 provides a structure for the antenna and boom assembly into which is situated the electronic compass 604 and four connectors for dipole elements 608 onto which are attached the dipole elements 404 and dipole elements 406. Onto the user-facing section of the housing 606 is the display 602 providing a visual indication of the target emitter signal direction based on the electronic compass 604 along with a first line of bearing.

Figure 7:
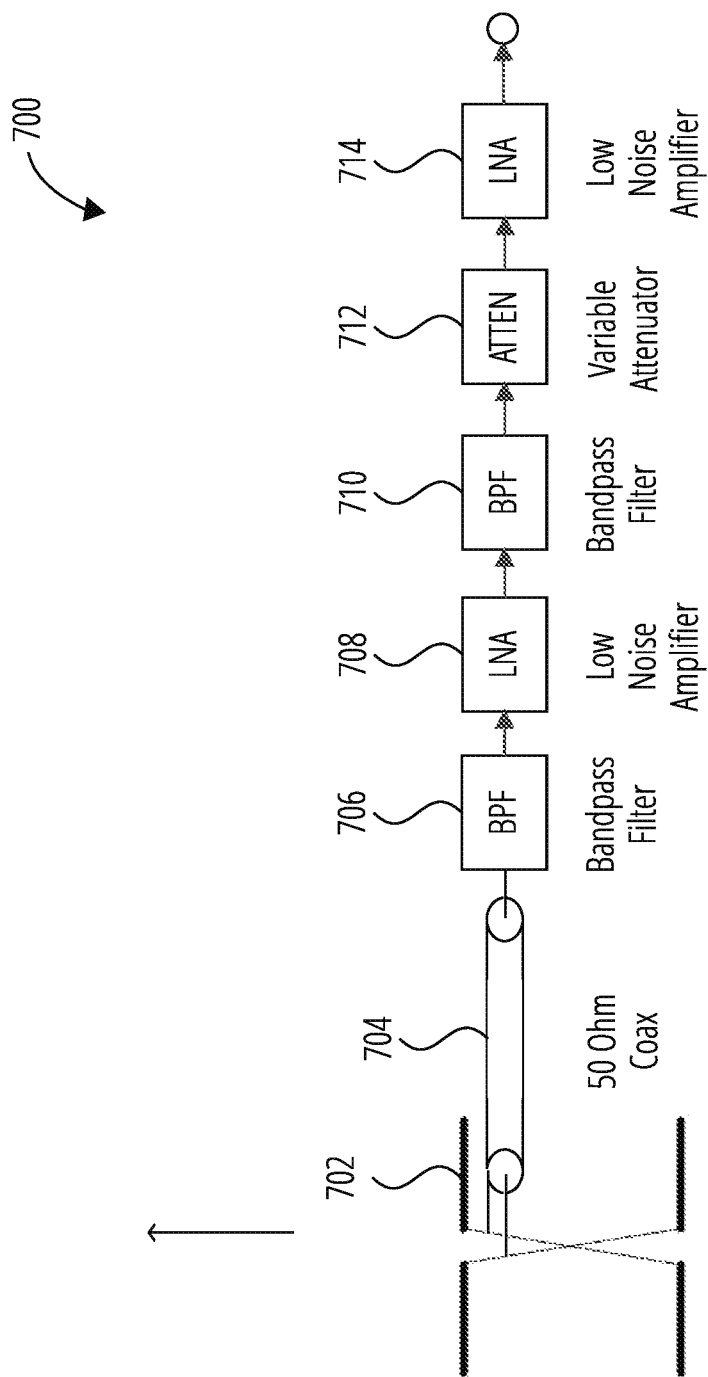
FIG. 7 illustrates an antenna and boom assembly 700 comprising a complete receiver front end for operation in a particular frequency band.

Referring to FIG. 7, an antenna and boom assembly 700 comprises a complete receiver front end for operation in a particular frequency band. The antenna and boom assembly 700 in this embodiment has been built for detecting a 121.5 MHz frequency.

The antenna 702, as shown, includes crossed feed lines between its front and back elements. The length and impedance of this transmission line are critical parts of the antenna 702, as well as 4:1 impedance transformers at each end. The first bandpass filter 706 and second bandpass filter 710 provide image rejection at a 21.4 MHz frequency away from the desired signal (10.7 MHz $1^{st}$ IF in the receiver). In an embodiment, the first low noise amplifier 708 provides about 25 dB gain. The variable attenuator 712 provides about 4 to 25 dB attenuation. The electrical interface to the boom includes: a 50 ohm coaxial RF output 704, a 3.3 volt power supply, and an attenuator voltage control line.

Figure 8:
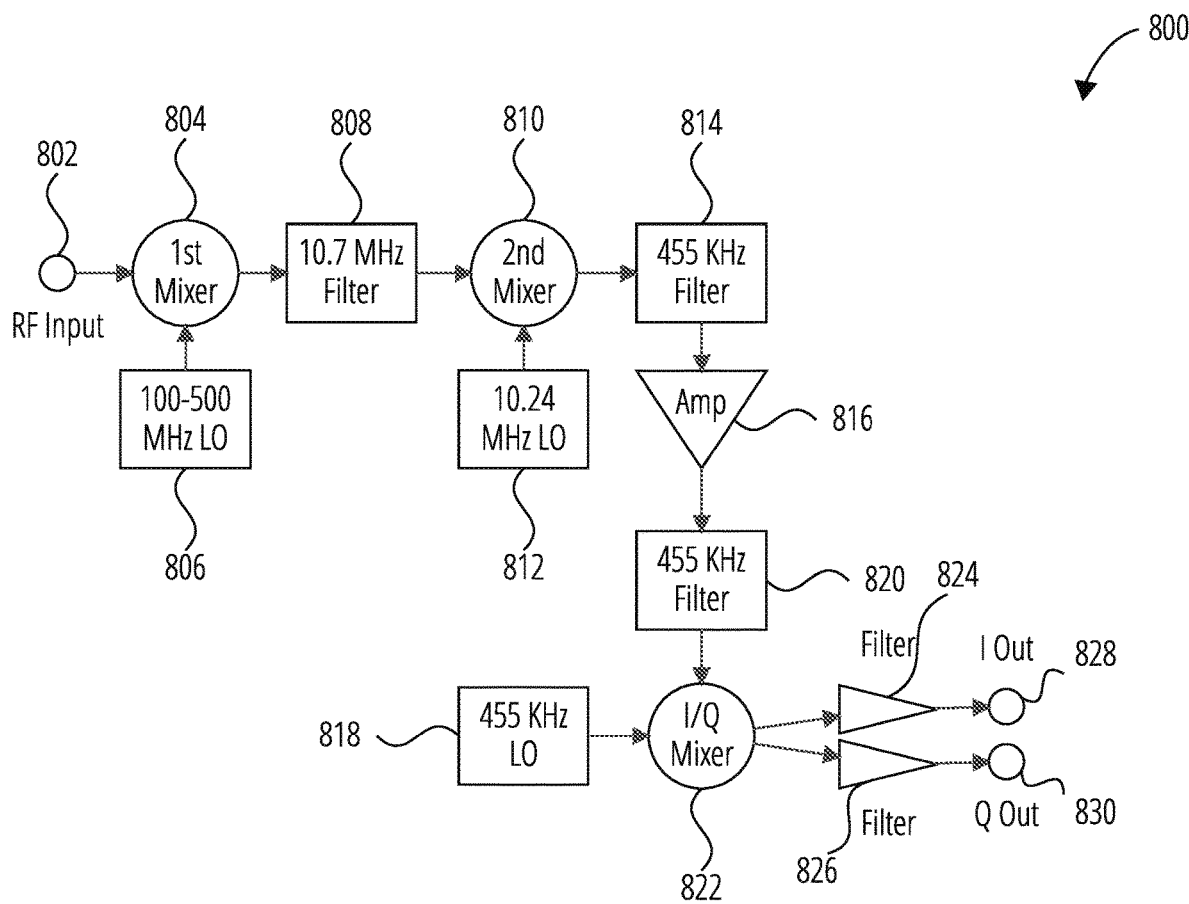
FIG. 8 illustrates an RF Board 800 showing the radio frequency module architecture, including filters, mixers and an amplifier.

Referring to FIG. 8, an RF Board 800 is included as part of the receiver assembly (also including the DSP board 900) as part of a single board.

In an embodiment, the RF Board 800 architecture may include a 1st mixer 804, amplifier 816, and I/Q mixer 822 as part of the AD607 receiver chip. The 100-500 MHz LO 806 is generated by a digital synthesizer chip. The 10.24 MHz LO 812 is generated by a crystal oscillator. The 455 KHz LO 818 comes from the DSP board where it is generated by a Pulse Width Modulator in the freescale DSP 906 controller chip. The 10.7 MHz filter 808, 455 KHz filter 814 and 2nd mixer 810 are single chip items on the receiver board. The I filter 824 and Q filter 826 are Sallen Key active audio filters.

The electrical interface to the receiver board includes the following: a 4.2 volt power supply 902 and Ground from the DSP board; an RF input from the antenna and boom assembly 700, control lines for the 100-500 MHz synthesizer; a muxout line from the synthesizer to the DSP board 900; gain control for the receiver chip from the DSP board 900; 455 KHz IF from the DSP board 900; and I and Q audio outputs to the DSP board 900.

Figure 9:
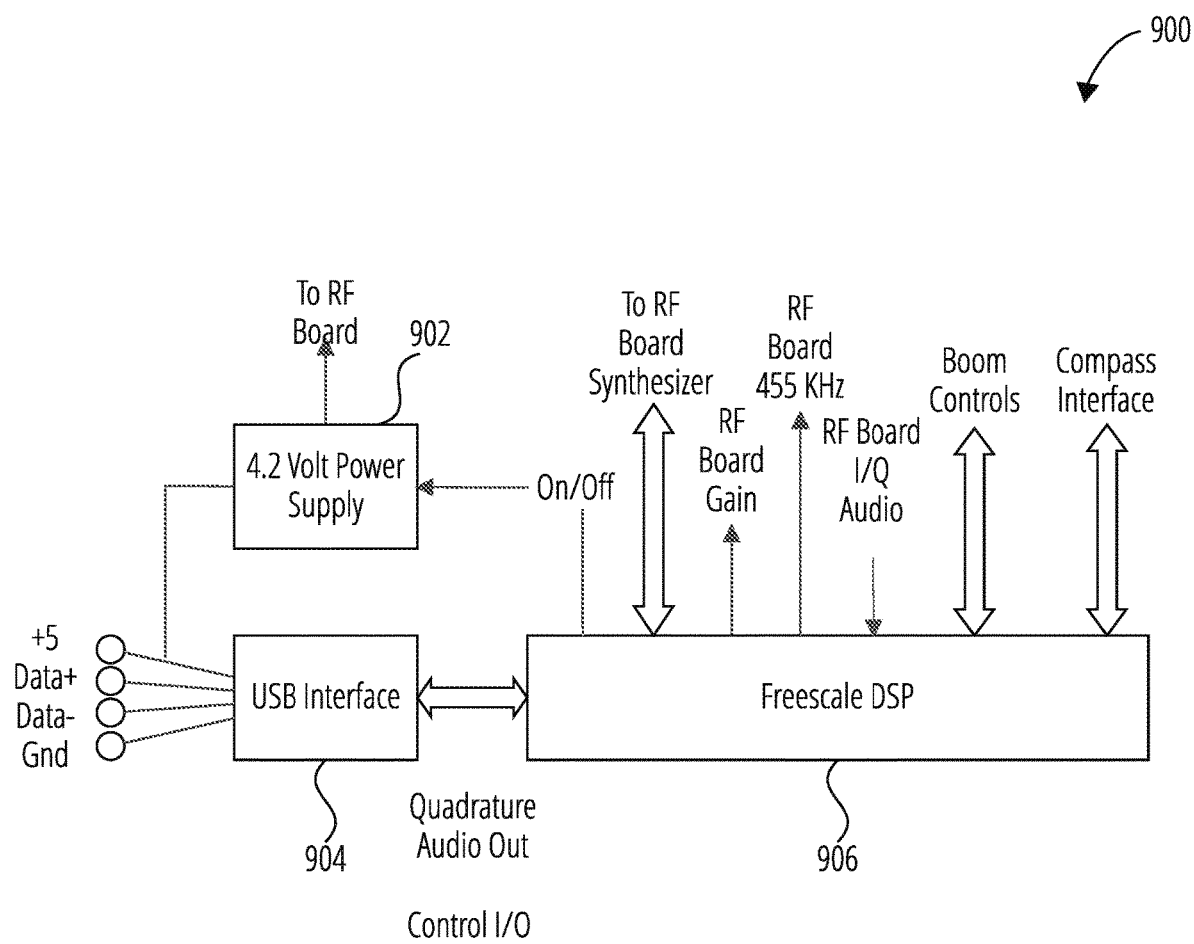
FIG. 9 illustrates a DSP board 900 showing the complete digital signal processing module architecture.

Referring to FIG. 9, a DSP board 900 describes the digital signal processing module architecture. In and embodiment, power is drawn from a battery Array of 6 AA batteries. The 4.2 volt power supply 902 provides power to the RF Board 800, electronic compass 424 and boom assembly boards under control of the DSP module. The freescale DSP 906 controls the Synthesizer, gain, and 455 KHz LO 818 for the RF board, as well as receives the I and Q audio signals from the RF Board 800. It also interfaces directly to the boom assembly providing control and data paths. The USB interface 904 comprises the communications channel to a smartphone via a small set of command and data messages. The DSP board 900 processes the I filter 824 and Q filter 826 inputs from the RF Board 800 to provide a signal strength measurement as well as any required signal demodulation.

Figure 10:
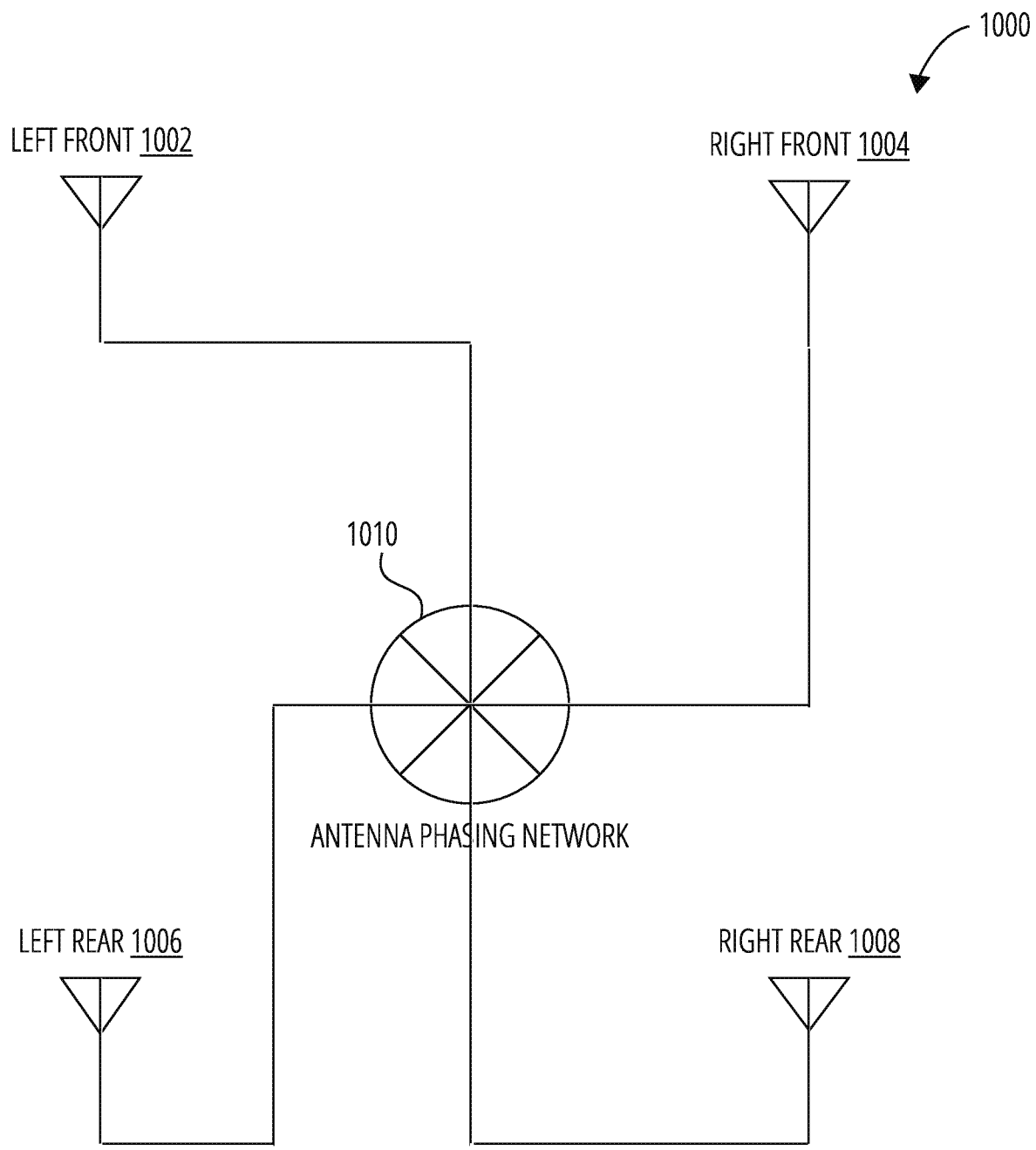
FIG. 10 illustrates a phase array circuitry 1000 showing dual dipole elements as comprised of the left front 1002, right front 1004, left rear 1006 and right rear 1008 elements of the phased-array antenna.

Referring to FIG. 10, phase array circuitry 1000 uses an antenna phasing network 1010 to phase the dipole elements, as shown with the portable direction finder 200 in FIG. 2 and FIG. 3, increasing the precision of the rescue beacons' directionality. The phasing process allows the portable direction finder to ignore signals that may be nearby in location and frequency to those detected.

Precision and signal gain may be increased by feeding both the left front 1002 and right rear 1008 dipole elements at the antenna phasing network 1010 while the opposing right front 1004 and left rear 1006 dipoles allow the antenna phasing network 1010 to use differing values and timing for peak signal strength detection.

Figure 11:
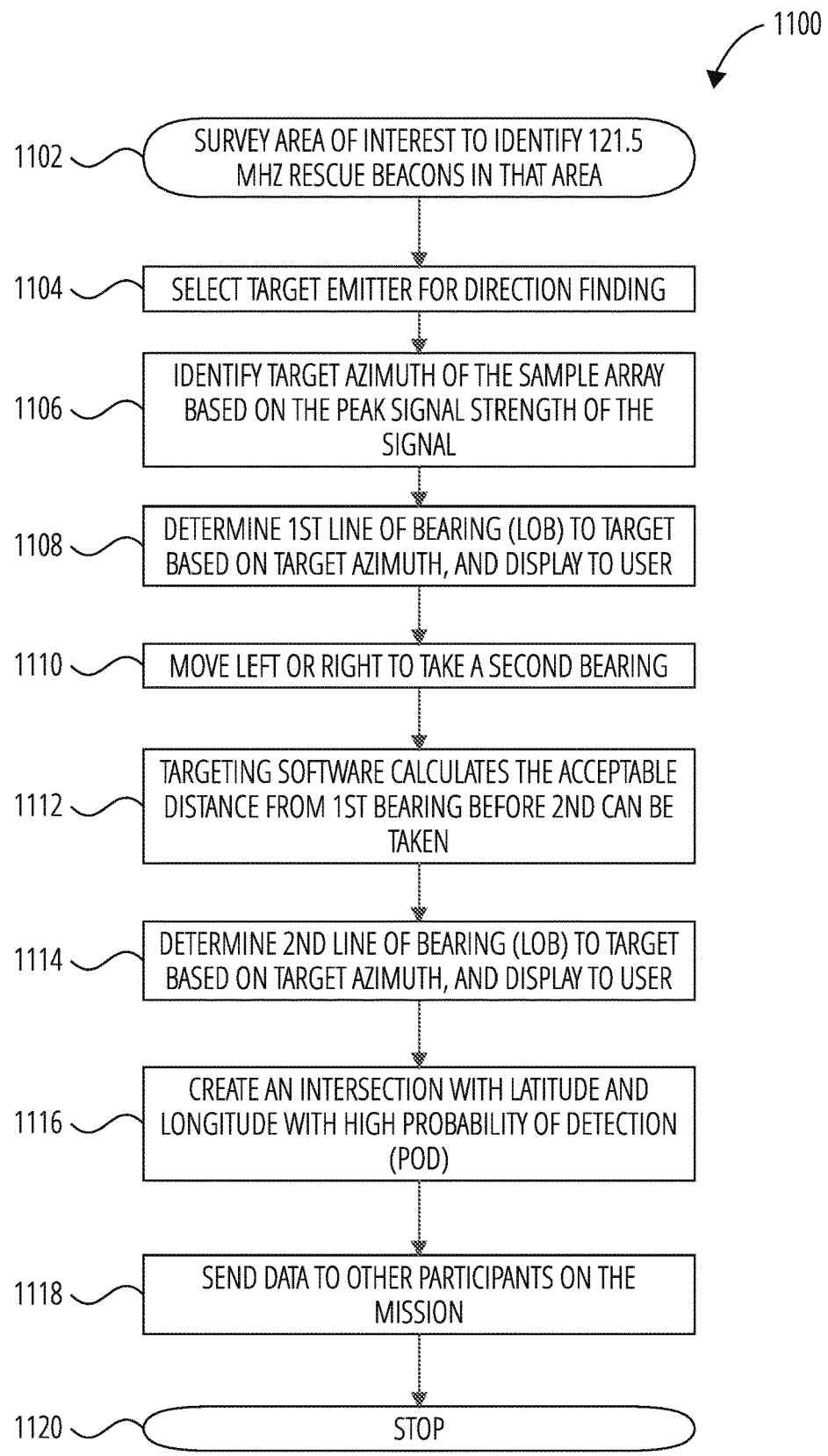
FIG. 11 illustrates a flowchart describing a radio direction finder routine 1100 showing the specific steps in the routine, starting with the step to survey of the area of interest to identify 121.5 MHz rescue beacons in that area 1102 and stopping after the step to send the data to other participants on the mission 1118.

Referring to FIG. 11, a flowchart describing a radio direction finder routine 1100, includes conducting a survey of the area of interest to identify 121.5 MHz rescue beacons in that area 1102. Once that frequency is located, the portable direction finder proceeds to select a target emitter for direction finding 1104. Once the target emitter is selected, the next step is to identify the target azimuth of the sample array based on the peak signal strength of the signal 1106. With the target azimuth identified, the next step is to determine a first line of bearing (LOB) to the target based on the target azimuth, and display to user 1108 on the display 412. The user may then move left or right to take a second line of bearing 1110. At this point, the targeting software calculates the acceptable distance of the first line of bearing before a second line of bearing can be taken 1112. The software can then determine the second line of bearing (LOB) to the target based on the target azimuth, and display to user 1114. With the second line of bearing determined, the application can create an intersection with latitude and longitude with a high probability of detection (POD) 1116 and send the data to other participants on the mission 1118, thus completing the routine.

What is claimed is:

1. A portable direction finding system, comprising:
   a housing;
   an antenna and boom assembly attached to the housing, the antenna and boom assembly and comprising a phased-array antenna including two dipole elements, wherein the phased-array antenna receives 121.5 MHz signals;
   a receiver assembly within the housing, the receiver assembly including a radio frequency module and a digital signal processing module (a DSP module), wherein a signal from the antenna and boom assembly and boom assembly is received by an RF module;
   an electronic compass within the housing, the electronic compass in communication with the digital signal processing module and providing a direction in which the portable direction finding system is pointed;
   a display on the housing to indicate the direction from the electronic compass; and
   a handle on the housing.

2. The portable direction finding system of claim 1, further comprising a 406 RF module capable of receiving 406 MHz signals.

3. The portable direction finding system of claim 2, further comprising an AIS frequency detection module capable of receiving 161 MHz and 162 MHz signals, extracting the geographical location of rescue beacons on or near bodies of water, and using the 406 RF module to decode the rescue beacons for their geographical location.

4. The portable direction finding system of claim 1, further comprising a mount for a smartphone, wherein the DSP module provides data to the smartphone.

5. A method of directing finding, comprising:
   surveying an area of interest to identify rescue beacons in the area using a portable direction finder, wherein the rescue beacons include emitters of a signal, and the portable direction finder includes:
   a housing;
   an antenna and boom assembly attached to the housing, the antenna and boom assembly and comprising a phased-array antenna including two dipole elements, wherein the phased-array antenna receives 121.5 MHz signals;
   a receiver assembly within the housing, the receiver assembly including a radio frequency module and a digital signal processing module processing (DSP) module, wherein the signal from the antenna and boom assembly is received by an RF module;
   an electronic compass within the housing, the electronic compass in communication with the digital signal processing module processing module and providing a direction in which the portable direction finder is pointed;
   a display on the housing to indicate the direction from the electronic compass; and
   a handle on the housing;
   selecting a target emitter for the direction determination;
   identifying a target azimuth of the target emitter based on peak signal strength of the signal, wherein a DSP module provides the signal strengths allowing a user to determine the peak signal strength;
   determining a first line of bearing to the target emitter, from a first location, based on the target azimuth;
   displaying the first line of bearing to the user;
   determining a second line of bearing after moving left or right of the first location;
   displaying the second line of bearing to the user; and
   determining an intersection between the first line of bearing and the second line of bearing, wherein the intersection is a latitude and longitude with high probability of detection.

6. The method of claim 5, wherein the portable direction finder further comprises a mount for a smartphone, and the user enters the first line of bearing and the second line of bearing into the smartphone.

7. The method of claim 5, wherein the portable direction finder further comprises a 406 RF module capable of receiving 406 MHz signals, and the surveying of the area includes identifying 406 MHz signals.

8. The method of claim 7, wherein the portable direction finder further comprises an AIS frequency detection module capable of receiving 161 MHz and 162 MHz signals, extracting the geographical location of rescue beacons on or near bodies of water, and using the 406 RF module to decode the rescue beacons for their geographical location.

* * * * *